United States Patent

Weyman et al.

[11] Patent Number: 5,090,263
[45] Date of Patent: Feb. 25, 1992

[54] GEAR COUPLER

[75] Inventors: Roger M. Weyman; John R. Barton, both of Coventry, United Kingdom

[73] Assignee: Massey Ferguson Services N.V., England

[21] Appl. No.: 656,997

[22] Filed: Feb. 15, 1991

[30] Foreign Application Priority Data

Feb. 28, 1990 [GB] United Kingdom ............. 9004540

[51] Int. Cl.$^5$ ............................................. F16D 23/06
[52] U.S. Cl. ..................................... 74/339; 192/53 F
[58] Field of Search .............. 74/339; 192/53 F, 53 G

[56] References Cited

U.S. PATENT DOCUMENTS

| 2,416,083 | 2/1947 | Battaline | 192/67 |
| 2,504,409 | 4/1950 | Haefeli | 192/53 G X |
| 3,385,407 | 5/1968 | Kleinhans et al. | 192/53 |
| 3,797,325 | 3/1974 | Christison | 74/339 |
| 4,360,094 | 11/1982 | Ikemoto et al. | 74/339 X |
| 4,540,074 | 9/1985 | Maggo et al. | 192/53 G |
| 4,817,773 | 4/1989 | Knodel et al. | 74/339 |
| 4,836,348 | 6/1989 | Knodel et al. | 74/339 X |

FOREIGN PATENT DOCUMENTS

| 0184077 | 6/1986 | European Pat. Off. . | |
| 0231986 | 8/1987 | European Pat. Off. . | |
| 292319 | 11/1988 | European Pat. Off. | 192/53 F |
| 1040385 | 10/1958 | Fed. Rep. of Germany . | |
| 1815167 | 8/1969 | Fed. Rep. of Germany . | |
| 2165449 | 3/1973 | France . | |
| 786828 | 11/1957 | United Kingdom . | |
| 843143 | 8/1960 | United Kingdom . | |
| 934677 | 8/1963 | United Kingdom . | |
| 1029847 | 5/1966 | United Kingdom . | |
| 1083459 | 9/1967 | United Kingdom . | |
| 1397178 | 6/1975 | United Kingdom . | |
| 2152163 | 7/1985 | United Kingdom | 74/339 |
| 2180625 | 4/1987 | United Kingdom . | |

Primary Examiner—Dwight Diehl
Attorney, Agent, or Firm—MacMillan, Sobanski & Todd

[57] ABSTRACT

A gear coupler for coupling a gear to a shaft includes a first coupling member which is connected for rotation with the shaft and a second coupling member which is connected for rotation with the gear and engageable by the first coupling member. The second coupling member is capable of limited circumferential movement relative to the gear to allow the first and second coupling members to engage each other without the need to rotate the gear. The advantage of this arrangement is that gears can be engaged without the operator needing to exert excessive actuation force on any actuating system which controls the movement of the coupler.

9 Claims, 1 Drawing Sheet

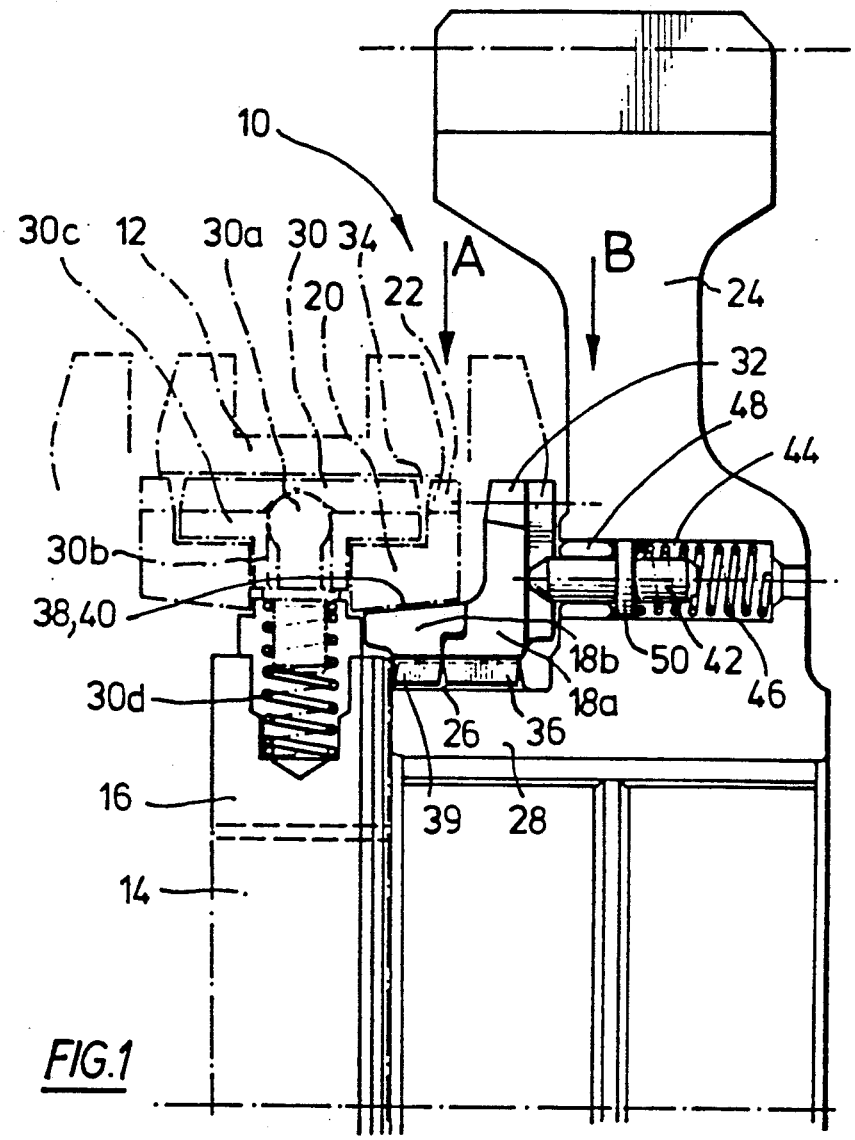
FIG.1
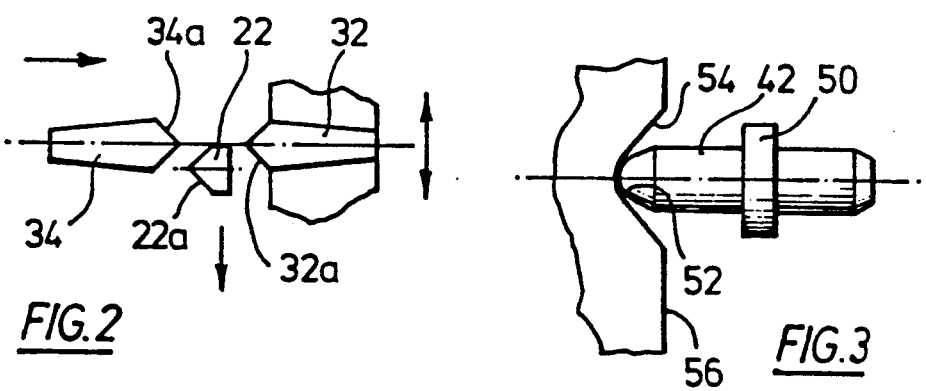
FIG.2
FIG.3

GEAR COUPLER

BACKGROUND OF THE INVENTION

The present invention relates to a gear coupler for coupling a gear to a shaft and more particularly to such a coupler which is comparatively easy to engage when the gear to be engaged is not freely rotatable when engagement is to be achieved.

For example, a number of different types of synchromesh couplers are known in which friction surfaces, which rotate with the gear and shaft respectively, are brought into contact with each other to synchronize the rotational speeds of the gear and shaft, and balking means are provided to prevent engagement between a coupling member associated with the shaft and a coupling member associated with the gear until synchronization has occurred.

While these different types of synchromesh couplers operate adequately in most circumstances, problems can arise when they are used in applications where large gear ratios are employed, for example, in the output stages of a transmission where range changing stages are employed.

In such applications, in order to complete the coupling of the gear to the shaft after synchronization, it may be necessary for the synchromesh coupler to generate sufficient rotational force to rotate the coupling member associated with the gear together with the gear itself and any associated meshing gears against a large torque reaction. Since the force required to rotate the coupling member associated with the gear and any associated meshing gears must be provided by the vehicle operator via a gear lever which controls the synchromesh coupler, this may lead to unacceptably high (even impossible) gear lever forces being required.

It is an object of the present invention to obviate or mitigate the foregoing problem.

SUMMARY OF THE INVENTION

According to the present invention, there is provided a coupler for coupling a gear to a shaft comprising a first coupling member which is connected for rotation with the shaft, and a second coupling member connected for rotation with the gear and engageable by the first coupling member to couple the gear to the shaft, the coupler being characterized in that the second coupling member is capable of limited circumferential movement relative to the gear to allow the first and second coupling members to engage each other without the need to rotate the gear.

Preferably, there is provided a synchronizing means for substantially synchronizing the speed of rotation of the shaft and gear, and a balking means interposed between the first and the second coupling members to inhibit engagement of the first coupling member by the second coupling member until their respective rotational speeds are substantially synchronized.

The coupler may be provided with a means for resisting the limited circumferential movement of the second coupling member relative to the gear and to centralize the second coupling member relative to the gear. This may comprise a plurality of spring-loaded poppets which operate in angled grooves provided in the second coupling member.

The first coupling member is preferably provided with a plurality of teeth positioned around an inner circumference for engagement with a plurality of teeth positioned around an outer circumference of the second coupling member.

The second coupling member may be provided with splines which are interposed between and engageable with splines provided on the gear. The thickness each of the splines on the second coupling member is less than the distance between each of the splines on the gear, thereby allowing the second coupling member to move circumferentially relative to the gear in either direction from a centralized position by an amount not greater than the thickness of one of the teeth on the second coupler.

Preferably, the second coupling member is allowed to move circumferentially relative to the gear in either direction from its centralized position by an amount sufficient to index the teeth positioned thereon a distance equal to half the thickness of one of the teeth positioned thereon.

BRIEF DESCRIPTION OF THE DRAWINGS

The present invention will now be more particularly described, by way of example only, with reference to the accompanying drawing in which:

FIG. 1 is a cross-section view of a coupling arranged in accordance with the present invention;

FIG. 2 is a view of the teeth arrangement taken in the direction of arrow B in FIG. 1; and FIG. 3 is a view of the spring-loaded poppet arrangement taken in the direction of arrow B in FIG. 1.

DETAILED DESCRIPTION OF THE PREFERRED EMBODIMENT

Referring to FIG. 1, a coupler 10 comprises a first coupling member in the form of a coupling sleeve 12 connected for rotation with a shaft 14 via a central hub member 16, a second coupling member formed in two parts 18a, 18b, a balking ring 20 having teeth 22 provided on an outer surface thereof, a gear 24 having splines 26 provided on an extension 28 thereof, and three spring-loaded struts 30 (only one is illustrated) at equally spaced circumferential locations. The coupling sleeve 12 is moved axially by a selector fork and other linkage (not shown) which connects the coupling sleeve 12 to a gear selector lever (not shown) which is operated by a vehicle operator.

The first part of the second coupling member 18a is provided with a plurality of teeth 32 on an outer surface and a plurality of splines 36 on an inner surface. The teeth 32 engage with teeth 34 provided around an inner circumference of the coupling sleeve 12, while the splines 36 engage with the splines 26 provided on the extension 28 of the gear 24. A dog (not shown) is provided to allow limited circumferential movement of the balking ring 20 relative to the coupling sleeve 12.

The thickness of each of the splines 36 on the first part 18a is less than the distance between each of the splines 26 on the gear 24, thereby permitting the part 18a to move circumferentially relative to the gear 24 in either direction from a centralized position by an amount not greater than the thickness of one of the teeth on the second coupling member before the splines 36, 26 engage and torque is transmitted therethrough. Preferably, the first part of the second coupling member 18a is allowed to move circumferentially relative to the gear 24 in either direction from its centralized position by an amount sufficient to index the teeth 32 positioned thereon a distance equal to half the thickness of one of the teeth 32 positioned thereon.

The second part 18b of the second coupling member is provided with splines 39 on an inner surface for direct engagement and movement with the splines 26 on the gear 24. An external friction cone surface 38 provided on the second part 18b is positioned to cooperate with a corresponding internal friction cone surface 40 provided on the balking ring 20.

Each of the teeth 22, 32, 34 provided on the balking ring 20, the first part 18a, and the coupling sleeve 12, respectively, are provided with a lead-in portion 22a, 32a, 34a formed by chamfering each side of the leading edge of said teeth.

The chamfered portions 34a on the coupling sleeve teeth 34 slide over the chamfered portions 22a of the teeth 22 provided on the balking ring 20 or chamfered portion 32a of the teeth 32 on the first part 18a to rotate the balking ring 20 or first part 18a upon axial displacement of the coupling sleeve 12.

A means is provided for resisting the limited circumferential rotation of the first part 18a relative to the gear 24 such as, for example, a plurality of poppets 42 circumferentially spaced around the gear 24 and housed in holes 44 provided therein. Each poppet 42 is spring-loaded by means of a coil spring 46 or the like provided around the poppet 42. Each poppet 42 is retained in its hole 44 by a ring 48 which abuts against a flange 50 provided on the poppet 42. The outer end 52 of each poppet 42 engages an angled recess 54 provided in the rear face 56 of the first part of the coupling member 18a (best seen in FIG. 3).

The recess 54 is positioned such that circumferential displacement in either direction of the first part 18a relative to the gear 24 causes the spring-loaded poppets 42 to be displaced into their respective holes 44. The force stored in the compressed springs 46 acts as a restoring force and effectively biases the first part 18a towards a neutral position in which the splines 36 on the first part 18a are centralized circumferentially within the splines 26 on the gear 24.

The spring-loaded struts 30 each comprise a detent poppet 30a which is spring-loaded radially outwardly in a bore 30b in a block 30c by a coil spring 30d. The head of each poppet 30a engages a circumferential extending groove 12a cut in the teeth 34 to act as a detent against movement of the coupling sleeve relative to the blocks 30c.

In operation, to initiate engagement of gear 24, the gear selector lever is moved to displace the coupling sleeve 12 towards the gear 24 such that the spring-loaded struts 30 tilt and move axially and force the friction cone surface 40 on the balking ring 20 into contact with the friction cone surface 38 on the second part 18b of the second coupling member. A drag effect known as cone torque is created between the two friction surfaces which acts to rotate the balking ring 20 relative to the coupling sleeve until the chamfered portions 34a and 22a of the teeth 34 and 22 on the sleeve 12 and balking ring 20 come into contact. Further axial movement of the coupling sleeve 12 generates an axial thrust on the balking ring 20, via teeth 34a, 22a, to increase the drag effect at surfaces 38, 40 to synchronize the speed of rotation of sleeve 12 and the gear 24.

During synchronization rotation of the balking ring 20 by the cone torque prevents the teeth 34 of the coupling sleeve 12 from passing between the teeth 22 of the balking ring 20 to engage the teeth 32 which rotate with the gear 24.

The detent capability of poppets 30a is arranged to be such that the force which must be applied to sleeve 12 to disengage the heads of poppets 30a from the groove 34 is sufficient to generate the necessary drag effect at surfaces 38, 40 to initiate rotation of the second part 20.

During synchronization, the cone torque generated at surfaces 38, 40 is arranged to be greater than or equal to the index torque generated by teeth 34a, 22a so that the interengaging teeth 34a, 22a are then prevented from rotating the balking ring 20 to allow full gear engagement.

After synchronization has occurred, the cone torque is less than the indexing torque, and the interengaging teeth portions 34a, 22a, are then able to rotate the balking ring 20 backwards sufficiently to allow teeth 34 to pass between teeth 22 and engage teeth 32 associated with the gear to couple the gear.

Because of the capability of the first part 18a of the second coupling member to rotate through a limited circumferential distance relative to gear 24, should the teeth 34 not be in alignment with the gaps between teeth 32, it is only necessary for the cooperating chamfered portions 34a and 32a of these teeth to generate sufficient rotational force to rotate the part 18a relative to gear 24 against the action of spring-loaded poppets 42 to allow coupling of the sleeve 12 with the teeth 32 associated with gear 24. This avoids the necessity for the coupler to generate sufficient force to rotate gear 24 itself and any associated meshing gears in the transmission against possibly high torque loads, thus significantly lowering the forces which the operator must apply to the gear lever to achieve complete synchronization and coupling of the gear 24 with shaft 14.

As will be appreciated, when sleeve 12 is coupled to teeth 32, the first part 18a rotates relative to gear 24 through a small distance. When transmitting torque the splines 36 abut the splines 26 on gear 24.

Whenever the gear 24 is disengaged the spring-loaded poppets 42 act to re-centralize the first part 18a relative to the gear in preparation for gear re-engagement.

It will be appreciated from the above that engagement of a gear in a gear box incorporating a coupler arranged in accordance with the present invention will not be limited by the operator's ability to exert sufficient force to rotate the coupling member associated with the gear together with the gear itself and any associated meshing gear against a large torque reaction.

Although the present invention has been described above with reference to a balking ring type synchromesh coupler, it will be appreciated that it is applicable to all other types of synchromesh coupler such as, for example, the blocking pin type as described and claimed in European Pat. application No. EP-B-0098841. Also, the invention is applicable to a crash type of coupler which includes no synchronization function, such as would be obtained if balking ring 20 and second part 18b were omitted from the arrangement described above.

What is claimed is:

1. A coupler for coupling a gear to a shaft comprising:
   a first coupling member which is connected for rotation with the shaft; and
   a second coupling member connected for rotation with the gear and being engageable by the first coupling member to couple the gear to the shaft, the second coupling member being capable of limited circumferential movement relative to the gear to allow the first and second coupling members to engage each other without the need to rotate the gear.

2. A coupler as claimed in claim 1 in which there is provided a synchronizing means for substantially synchronizing the speed of rotation of the shaft and gear and a balking means interposed between the first and the second coupling members to inhibit engagement of the first coupling member by the second coupling member until their respective rotational speeds are substantially synchronized.

3. A coupler as claimed in claim 1 in which there is provided a means for resisting the limited circumferential movement of the second coupling member relative to the gear.

4. A coupler as claimed in claim 3 in which the means for resisting the limited circumferential movement comprises a plurality of spring-loaded poppets which operate in angled grooves provided in the second coupling member.

5. A coupler as claimed in claim 3 in which the means for resisting the limited circumferential movement of the second coupling member also acts to centralize the second coupling member relative to the gear.

6. A coupler as claimed in claim 1 in which the first coupling member is provided with a plurality of teeth positioned around an inner circumference for engagement with a plurality of teeth positioned around an outer circumference of the second coupling member.

7. A coupling member as claimed in claim 6 in which the second coupling member is provided with splines which are interposed between and engageable with splines provided on the gear and in which the thickness of each of the splines on the second coupling member is less than the distance between each of the splines on the gear, thereby allowing the second coupling member to move circumferentially relative to the gear.

8. A coupling member as claimed in claim 6 in which the second coupling member is provided with splines which are interposed between and engageable with splines provided on the gear and in which the thickness of each of the splines on the second coupling member is less than the distance between each of the splines on the gear, thereby allowing the second coupling member to move circumferentially relative to the gear in either direction from a centralized position by an amount not greater than the thickness of one of the teeth on the second coupling member.

9. A coupling member as claimed in claim 6 in which the second coupling member is provided with splines which are interposed between and engageable with splines provided on the gear and in which the thickness of each of the splines on the second coupling member is less than the distance between each of the splines on the gear, thereby allowing the second coupling member to move circumferentially relative to the gear in either direction from a centralized position by an amount equal to half the thickness of one of the teeth on the second coupling member.

* * * * *